US011677904B2

(12) United States Patent
Ahn et al.

(10) Patent No.: US 11,677,904 B2
(45) Date of Patent: Jun. 13, 2023

(54) REPORT EVALUATION DEVICE AND OPERATION METHOD THEREOF

(71) Applicant: Hyperconnect Inc., Seoul (KR)

(72) Inventors: Sang Il Ahn, Cheongju-si (KR); Beomjun Shin, Seoul (KR); Seokjun Seo, Seoul (KR); Hyeongmin Byun, Seoul (KR); Mingyun Chae, Seoul (KR)

(73) Assignee: Hyperconnect Inc., Seoul (KR)

( * ) Notice: Subject to any disclaimer, the term of this patent is extended or adjusted under 35 U.S.C. 154(b) by 0 days.

(21) Appl. No.: 17/199,766

(22) Filed: Mar. 12, 2021

(65) Prior Publication Data
US 2021/0289166 A1 Sep. 16, 2021

(30) Foreign Application Priority Data

Mar. 13, 2020 (KR) .................. 10-2020-0031244

(51) Int. Cl.
*H04N 7/14* (2006.01)
*H04M 3/22* (2006.01)
*G06N 20/00* (2019.01)
*G06F 11/00* (2006.01)

(52) U.S. Cl.
CPC ........... *H04N 7/147* (2013.01); *G06F 11/008* (2013.01); *G06N 20/00* (2019.01); *H04M 3/2281* (2013.01); *H04M 2201/50* (2013.01)

(58) Field of Classification Search
USPC ...................................................... 348/14.01
See application file for complete search history.

(56) References Cited

U.S. PATENT DOCUMENTS

| 7,151,826 B2* | 12/2006 | Shambaugh | H04M 3/51 379/265.06 |
| 7,564,476 B1* | 7/2009 | Coughlan | H04N 7/147 348/14.08 |
| 10,701,315 B2 | 6/2020 | Ahn et al. | |
| 2012/0317046 A1* | 12/2012 | Myslinski | G06Q 30/02 704/9 |
| 2013/0282722 A1* | 10/2013 | Grenier | G06F 16/9535 707/737 |

(Continued)

FOREIGN PATENT DOCUMENTS

JP 2011502307 A 1/2011
JP 2017016343 A 1/2017

(Continued)

OTHER PUBLICATIONS

Extended European Search Report for European Application No. 21162085.1, Search completed Jun. 23, 2021, dated Jul. 5, 2021, 7 Pgs.

(Continued)

*Primary Examiner* — Amal S Zenati
(74) *Attorney, Agent, or Firm* — KPPB LLP

(57) ABSTRACT

A report evaluation method of a report evaluation device may include receiving a report from at least one client terminal, determining a category of the received report, identifying a learning model corresponding to the category, evaluating a reliability of the report through the learning model, and generating and outputting information on the reliability.

13 Claims, 5 Drawing Sheets

(56) References Cited

U.S. PATENT DOCUMENTS

| | | | | |
|---|---|---|---|---|
| 2015/0058242 A1* | 2/2015 | Bucciarelli | ............ | H04W 4/16 |
| | | | | 705/325 |
| 2015/0088897 A1* | 3/2015 | Sherman | ............... | G06F 16/955 |
| | | | | 707/754 |
| 2017/0251336 A1* | 8/2017 | Keller | ................... | H04W 8/183 |
| 2018/0103234 A1* | 4/2018 | Ahn | ...................... | H04N 7/147 |

FOREIGN PATENT DOCUMENTS

| | | |
|---|---|---|
| JP | 2020004248 A | 1/2020 |
| KR | 20090006397 A | 1/2009 |
| KR | 10-2012-0138915 A | 12/2012 |
| KR | 10-2018-0116520 A | 10/2018 |
| KR | 20180129562 A | 12/2018 |
| WO | 2019043379 A1 | 3/2019 |

OTHER PUBLICATIONS

Japanese Office Action for Application No. 2021-040065, dated May 25, 2022, 4 pgs.
Korean Office Action for Application No. 10-2022-0017749, dated May 23, 2022, 4 pgs.

\* cited by examiner

FIG. 4

```
{
  "kind": "AUDIO_MULTI_LABEL_DRAG_REGION",
  "meta": {
    "coordinator_version": "v0.33",
    "model_logs": {
      {
        "v1.0.0-SAFESPEECH_SEGMENTATION-KO-32000": {
          "meta": {
            "api_version": "1.0.1",
            "model_version": "v1.0.0-SAFESPEECH_SEGMENTATION-KO-32000"
          },
          "probability_with_region": [
            {
              "end_sec": 8,
              "label2probability": {
                "babo": 9.894357208395377e-05,
                "eomma": 0.364932930065039,
                "michin": 0.9018191132605541497,
                "yamma": 7.673616892134305e-06
              },
              "start_sec": 6
            }
          ]
        }
      }
    },
    "prioritize_method": "NOT_CHOSEN"
  },
  "spec": {
    "annotating_count": 2,
    "display_info": {
      "filters": [
        {
          "activated_filter": "BASIC",
          "category": "LEVEL"
        },
        {
          "activated_filter": "VERBAL_ABUSE",
          "category": "REPORT_TYPE"
        }
      ],
      "task_order": [],
      "type": "audio",
      "url":
    },
    "pre_label": [
      {
        "end_sec": 8,
        "reliability": "AUTOMATABLE",
        "selected_label": "eomma",
        "start_sec": 6
      }
    ],
    "priority": 631963075,
    "report_id": 1
  }
}
```

REPORT EVALUATION DEVICE AND OPERATION METHOD THEREOF

CROSS-REFERENCE TO RELATED APPLICATION

This application claims the benefit of Korean Patent Application No. 10-2020-0031244, filed on Mar. 13, 2020, in the Korean Intellectual Property Office, the disclosure of which is incorporated herein in its entirety by reference.

BACKGROUND

1. Field

The described embodiments relate to a report evaluation device capable of preventing exposure to inappropriate content during a video call and an operation method thereof.

2. Description of the Related Art

With the development of communication technology and miniaturization of electronic devices, personal terminals are widely distributed to general consumers. In particular, portable personal terminals such as smartphones or smart tablets have been recently widespread. Most terminals include image capture technology. The user can take an image including various contents using the terminal.

There are various types of video call services based on video calls. For example, a random video chat service is a service that connects a terminal of a user who has requested to use a random video chat service with a terminal of a user randomly selected among users who use the random video chat service.

When a user makes a video call with a counterpart, the user may be exposed to inappropriate video or audio from the counterpart. When a user is exposed to inappropriate video or audio that the user does not want, the user may feel sexually ashamed or offensive.

SUMMARY OF THE INVENTION

According to the described example embodiments, a report evaluation device capable of preventing a user making a video call with a counterpart from being exposed to inappropriate video or audio from the counterpart and an operation method thereof may be provided.

In addition, a report evaluation device and an operation method thereof capable of preventing sexual shame or displeasure that a user making a video call with a counterpart may feel by a video from the counterpart may be provided.

Moreover, a terminal capable of inducing a sound video call between users and a method of operating the same may be provided.

According to an aspect, there is provided a report evaluation method including receiving a report from at least one client terminal, determining a category of the received report, identifying a learning model corresponding to the category, evaluating a reliability of the report through the learning model, and generating and outputting information on the reliability.

Alternatively, the report may include video information, text information, or audio information.

Alternatively, the report evaluation method further includes establishing a video call session between a plurality of client terminals, and the report may be received from at least one client terminal among the plurality of client terminals in receiving a report.

Alternatively, the report evaluation method further includes evaluating the reliability of the received report according to a predetermined criterion independently of the learning model and updating an associated learning model in response to the evaluation result.

Alternatively, the report may include information about inappropriate video content, information about inappropriate text content, or information about inappropriate sound content.

Alternatively, the learning model may correspond to one of a sound censoring algorithm, a video censoring algorithm, a text censoring algorithm, or a gesture censoring algorithm.

According to another aspect, there is provided a report evaluation device including a report receiving part configured to receive a report from at least one client terminal, a learning model storage part configured to store at least one learning model, and a reliability evaluation part configured to determine a category of the received report, to identify a learning model corresponding to the category among the at least one learning model, and to evaluate a reliability of the report through the learning model. The reliability evaluation part may generate and output information on the reliability.

Alternatively, the report may include video information or audio information.

Alternatively, the reliability evaluation part may further be configured to receive the report from at least one client terminal among a plurality of client terminals that have established a video call session with each other.

Alternatively, the reliability evaluation part may further be configured to evaluate the reliability of the received report according to a predetermined criterion independently of the learning model and update an associated learning model in response to the evaluation result.

Alternatively, the report may include information about inappropriate video content or information about inappropriate sound content.

Alternatively, the at least one learning model may correspond to one of a sound censoring algorithm, a video censoring algorithm, a text censoring algorithm, or a gesture censoring algorithm.

The report evaluation device and operation method thereof according to the described embodiments can prevent a user who makes a video call with a counterpart from being exposed to inappropriate video or audio from the counterpart.

In addition, the report evaluation device and operation method thereof can prevent sexual shame or displeasure that a user making a video call with a counterpart may feel by the video from the counterpart.

Moreover, the report evaluation device and operation method thereof can induce a sound video call between users.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4 is a diagram showing an algorithm for evaluating the reliability of a report according to an example embodiment of the present disclosure.

DETAILED DESCRIPTION OF EXEMPLARY EMBODIMENTS

Figure 1:
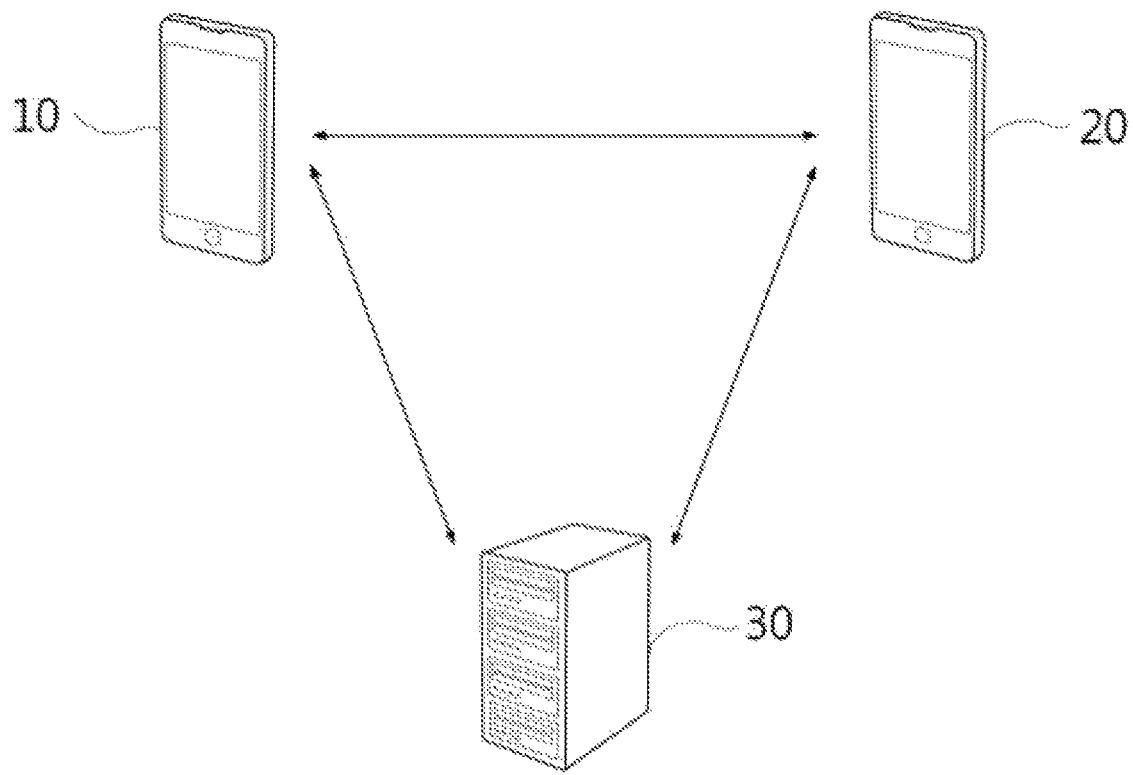
FIG. 1 is a diagram illustrating an environment in which a report evaluation device according to the present disclosure is operated.

Advantages and features of the present disclosure, and a method of achieving them will become apparent with reference to the example embodiments described below in detail together with the accompanying drawings. The present disclosure may, however, be embodied in many different forms and should not be construed as being limited to the example embodiments set forth herein. Rather, these example embodiments are provided so that this disclosure will be thorough and complete and will fully convey the concept of the disclosure to those skilled in the art, and the present disclosure will only be defined by the appended claims. Like reference numerals refer to like elements throughout the specification.

Although "first" or "second" is used to describe various components, these components are not limited by the terms as described above. The terms as described above may be used only to distinguish one component from another component. Therefore, the first component mentioned below may be the second component within the technical idea of the present disclosure.

The terms used in the present specification are for explaining example embodiments and are not intended to limit the present disclosure. In this specification, the singular form also includes the plural form unless specifically stated in the phrase. As used in the specification, "comprises" or "comprising" is implied that the recited component or operation does not exclude the presence or addition of one or more other components or operations.

Unless otherwise defined, all terms used in this specification may be interpreted as meanings that can be commonly understood by those skilled in the art to which the present disclosure pertains. In addition, terms defined in a commonly used dictionary are not interpreted ideally or excessively unless explicitly defined specifically.

FIG. 1 is a diagram illustrating an environment in which a report evaluation device according to the present disclosure may be practiced.

Referring to FIG. 1, the environment in which a first terminal 10 and a second terminal 20 operate may include a server 30, and the first terminal 10 and the second terminal 20 connected to the server 30 and to each other. For convenience of explanation, only two terminals, that is, the first terminal 10 and the second terminal 20 are shown in FIG. 1, but a larger number of terminals than two may be included. With respect to terminals that may be added, descriptions of the first terminal 10 and the second terminal 20 may be applied, except for the description to be specifically mentioned.

The server 30 may be connected to a communication network. The server 30 may be connected to other external devices through the communication network. The server 30 may transmit data to or receive data from other devices connected to each other.

The communication network connected to the server 30 may include a wired communication network, a wireless communication network, or a complex communication network. The communication network may include a mobile communication network such as 3G, LTE, or LTE-A. The communication network may include a wired or wireless communication network such as Wi-Fi, UMTS/GPRS, or Ethernet. Communication networks may include a local area communication network such as Magnetic Secure Transmission (MST), Radio Frequency Identification (RFID), Near Field Communication (NFC), ZigBee, Z-Wave, Bluetooth, Bluetooth Low Energy (BLE), or infrared communication (IR). The communication network may include a local area network (LAN), a metropolitan area network (MAN), or a wide area network (WAN).

The server 30 may receive data from at least one of the first terminal 10 and the second terminal 20. The server 30 may perform an operation using data received from at least one of the first terminal 10 and the second terminal 20. The server 30 may transmit the operation result to at least one of the first terminal 10 and the second terminal 20.

The server 30 may receive a mediation request from at least one of the first terminal 10 and the second terminal 20. The server 30 may select a terminal that has transmitted the mediation request. For example, the server 30 may select the first terminal 10 and the second terminal 20.

The connection information for the first terminal 10 may include, for example, an IP address and a port number of the first terminal 10. Upon receiving the connection information for the second terminal 20, the first terminal 10 may attempt to connect to the second terminal 20 using the received connection information.

When the connection attempt of the first terminal 10 to the second terminal 20 or of the second terminal 20 to the first terminal 10 is successful, a video call session between the first terminal 10 and the second terminal 20 may be established. The first terminal 10 may transmit video or sound to the second terminal 20 through the video call session. The first terminal 10 may encode video or sound into digital signals and transmit the encoded result to the second terminal 20.

In addition, the first terminal 10 may receive video or sound from the second terminal 20 through the video call session. The first terminal 10 may receive video or sound encoded as digital signals and decode the received video or sound.

The second terminal 20 may transmit video or sound to the first terminal 10 through the video call session. In addition, the second terminal 20 may receive video or sound from the first terminal 10 through the video call session. Accordingly, a user of the first terminal 10 and a user of the second terminal 20 can make a video call with each other.

When the user of the first terminal 10 detects inappropriate content from the video, text or sound received from the second terminal 20, a report may be performed. Likewise, when the user of the second terminal 20 detects inappropriate content in the video, text or sound received from the first terminal 10, a report may be performed.

For example, inappropriate content included in text or sound may respond to at least one of abusive language, insult, racism, defamation, obscenity, sexual harassment, hate speech, violence, abuse, and threats.

Alternatively, inappropriate content included in the video may respond to at least one of abusive gestures, insult gestures, racism gestures, sexual content, nudity, genitals, sexual activity, unsanitary content, anti-social content, antihuman content, illegal activity, criminal activity, hate crime, violent behavior, abusive behavior, hateful content, or threatening content.

The first terminal 10 and the second terminal 20 may be, for example, a desktop computer, a laptop computer, a smartphone, a smart tablet, a smart watch, a mobile terminal, a digital camera, a wearable device, or a portable electronic device. The first terminal 10 and the second terminal 20 can execute a program or application. Each of the first terminal 10 and the second terminal 20 may be the same type of device or a different type of device.

Figure 2:
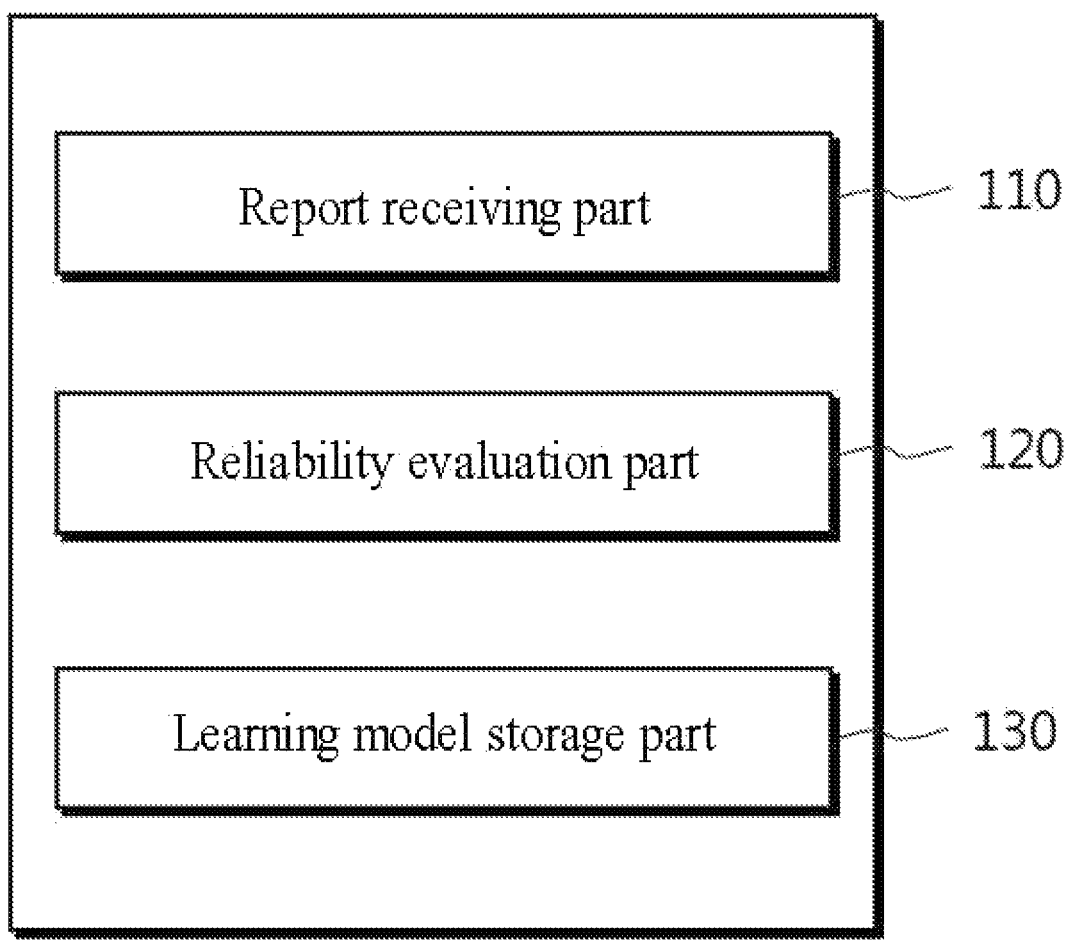
FIG. 2 is a diagram schematically illustrating the configuration of a report evaluation device 100 according to an example embodiment of the present disclosure.

FIG. 2 is a diagram schematically illustrating the configuration of a report evaluation device according to an example embodiment of the present disclosure.

Referring to FIG. 2, a report evaluation device according to an example embodiment of the present disclosure may include a report receiving part 110, a reliability evaluation part 120, and a model storage part (e.g., a learning model storage part 130). The report evaluation device 100 may be configured through a plurality of terminals 10 and 20 or the server 30 described with reference to FIG. 1.

The report receiving part 110 may receive a report from at least one of the first terminal 10 and the second terminal 20.

In some example embodiments, a video call session may be established between the first terminal 10 and the second terminal 20. During a video call session, when a user of the first terminal 10 or the second terminal 20 detects inappropriate content in a video, text, or sound received from a counterpart, a report may be performed. The report may be generated when a user who receives a video, text or sound containing inappropriate content reports.

The report may include information about inappropriate video content, information about inappropriate text content, or information about inappropriate sound content.

The information on inappropriate video content may include a video recorded for a predetermined time based on the time of reporting on the terminal that performed the report and information on the reason for the report. Alternatively, the information on inappropriate text content may include text received for a predetermined time based on the time of reporting to the terminal that performed the report and information on the reason for the report. Alternatively, the information on inappropriate sound content may include a sound recorded for a predetermined time based on the time of reporting on the terminal that performed the report and information on the reason for the report.

The report receiving part 110 may provide the received report to the reliability evaluation part 120.

The reliability evaluation part 120 may receive the report from the report receiving part 110. The reliability evaluation part 120 may classify a category of the received report. In some example embodiments, the categories may be classified into video, text, and sound.

The reliability evaluation part 120 may call a model (e.g., a learning model) corresponding to the category of the report to evaluate the reliability of the report.

The reliability evaluation part 120 may generate and output information on the reliability. The information on the reliability output may be output to a monitoring server (not shown) that monitors the user of the terminal that has provided the video, text, or sound including the inappropriate content.

The model storage part (e.g., a learning model storage part 130) may include at least one or more censoring algorithms. In some example embodiments, the model storage part (e.g., a learning model storage part 130) may include a sound censoring algorithm, a video censoring algorithm, a text censoring algorithm, or a gesture censoring algorithm. For example, the censoring algorithm may include a predetermined decision tree or a machine learning model.

When a call request is received from the reliability evaluation part 120, the model storage part (e.g., a learning model storage part 130) may provide a censoring algorithm corresponding to the call.

For example, the reliability evaluation part 120 may call a model (e.g., a learning model) corresponding to an attribute of the report received by the report receiving part 110, and may evaluate the reliability of the report using the called model.

According to an example embodiment, the reliability evaluation part 120 may call a model corresponding to the type of content based on the type of content (e.g., video content, text content, sound content, etc.) included in the report. For example, when a report is classified into a video category as video content is included in the specific report, the reliability evaluation part 120 may evaluate the reliability of the report using a video censoring algorithm (and/or a gesture censoring algorithm). For example, when text content is included in a specific report, the reliability evaluation part 120 may evaluate the reliability of the report using a text censoring algorithm. For example, when sound content is included in a specific report, the reliability evaluation part 120 may evaluate the reliability of the report using a sound censoring algorithm.

According to another example embodiment, the reliability evaluation part 120 may evaluate the reliability of the report by calling a model corresponding to the type of language included in the report or by calling a model corresponding to the request path for generating the report.

For example, the reliability evaluation part 120 may call a censoring algorithm corresponding to the type of language included in the content included in the report or the type of language included in the reason for the report.

For example, the reliability evaluation part 120 distinguishes the report generated by reporting through the user's nickname and the report generated by performing the report through the user profile, based on the reporting path in which the user report was generated, and a censorship algorithm corresponding to each report can be called.

Meanwhile, when there are two or more models corresponding to the attributes of the report, the reliability evaluation part 120 evaluates the reliability of the report using all of the two or more models, or it may also evaluate the reliability of the report using the model corresponding to a specific attribute having a high priority based on the priority between each attribute.

For example, when the report includes video content and text content, the reliability evaluation part 120 may evaluate the reliability of the report using at least one of a video censoring algorithm and a text censoring algorithm. For example, when the report includes English and Japanese, the reliability evaluation part 120 may evaluate the reliability of the report using at least one of a censoring algorithm corresponding to the English and a censoring algorithm corresponding to the Japanese.

Figure 3:
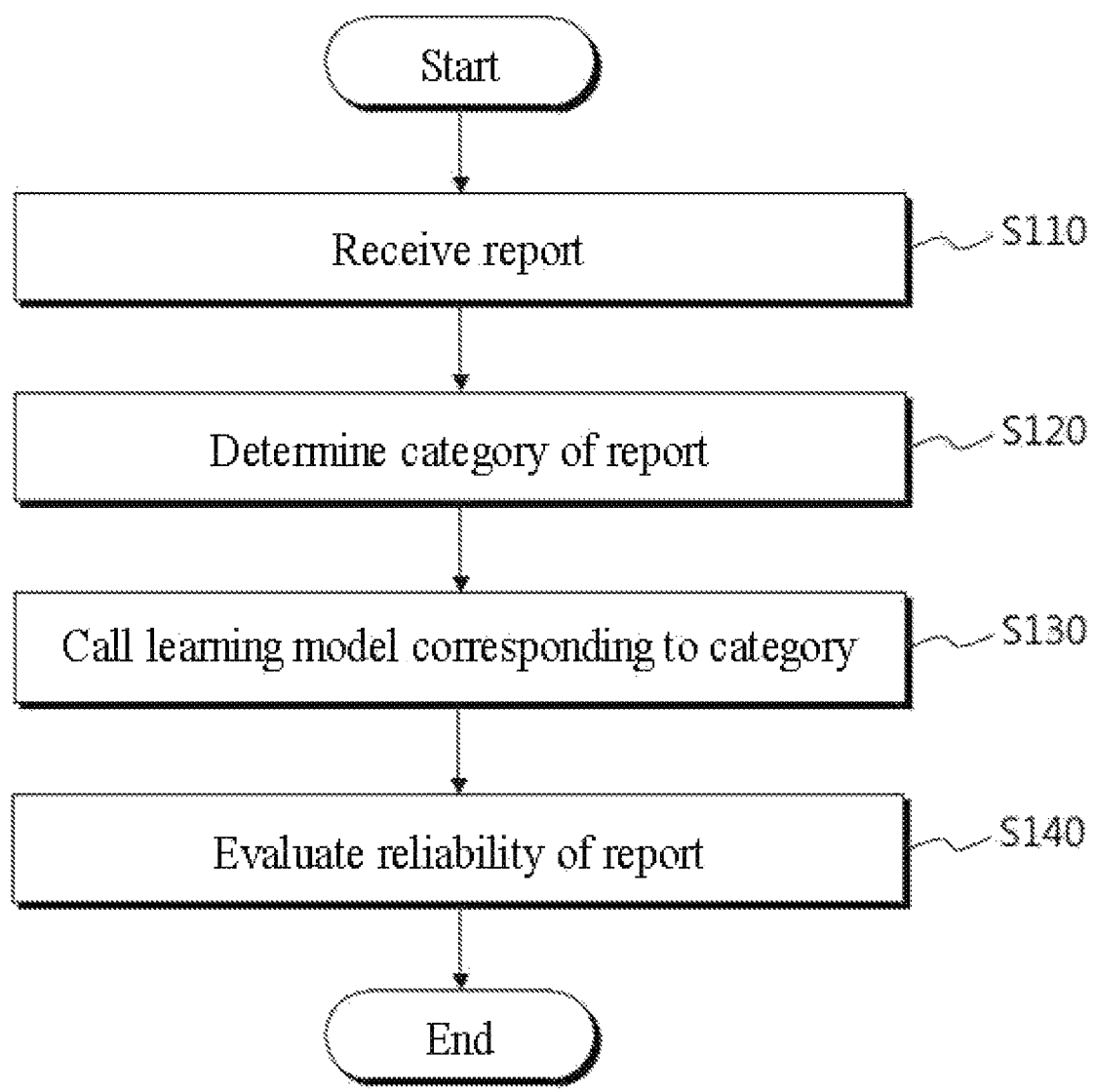
FIG. 3 is a flowchart illustrating a method of evaluating a report according to an example embodiment of the present disclosure.

FIG. 3 is a flowchart illustrating a method of evaluating a report according to an example embodiment of the present disclosure.

Referring to FIGS. 2 and 3, in operation S110, the report evaluation device 100 may receive a report from at least one of the first terminal 10 or the second terminal 20.

During a video call session, when a user of the first terminal 10 or the second terminal 20 detects inappropriate content in a video, text, or sound received from a counterpart, a report may be performed. The report may be generated when a user who receives a video, text or sound containing inappropriate content reports.

The report may include information about inappropriate video content, information about inappropriate text content, or information about inappropriate sound content.

The information on inappropriate video content may include a video recorded for a predetermined time based on the time of reporting on the terminal that performed the report and information on the reason for the report. Alternatively, the information on inappropriate text content may include text received for a predetermined time based on the time of reporting to the terminal that performed the report and information on the reason for the report. Alternatively, the information on inappropriate sound content may include a sound recorded for a predetermined time based on the time of reporting on the terminal that performed the report and information on the reason for the report.

In operation S120, the report evaluation device 100 may classify a category of the received report.

The reliability evaluation part 120 may receive the report from the report receiving part 110. The reliability evaluation part 120 may classify a category of the received report. In some example embodiments, the categories of the report may include categories corresponding to video, text, or sound. In another example embodiment, the category of the report may include categories corresponding to the language of each country. In yet another example embodiment, the category of the report may include categories corresponding to the request paths for generating each report.

For example, if the report includes information on inappropriate video content, the report evaluation device 100 may classify it into a video category. Alternatively, if the report includes information on inappropriate text content, the report evaluation device 100 may classify it into a text category. Alternatively, if the report includes information on inappropriate sound content, the report evaluation device 100 may classify it into a sound category.

In operation S130, the report evaluation device 100 may call a model (e.g., a learning model) corresponding to the classified category.

The report evaluation device 100 may include at least one or more censoring algorithms. In some example embodiments, the report evaluation device 100 may include a sound censoring algorithm, a video censoring algorithm, a text censoring algorithm, or a gesture censoring algorithm.

For example, the video censoring algorithm may include an algorithm of acquiring image data in units of a predetermined frame constituting a video and censoring the image data. For example, the video censoring algorithm may include an algorithm for extracting an image corresponding to a frame in a predetermined period (e.g., a frame period or a time period) from a video composed of a plurality of frames and inspecting the extracted image. Meanwhile, in an example embodiment, the predetermined period may be determined differently according to settings, and, for example, the predetermined period may be determined differently based on user information corresponding to a video. In addition, a period of acquiring the next frame may be adjusted based on the inspection result of the image acquired in the previous frame.

The sound censoring algorithm, the video censoring algorithm, the text censoring algorithm, and the gesture censoring algorithm can each be generated through an artificial intelligence (AI) system.

Artificial intelligence systems are systems in which computer machines that implement human-level intelligence learn and judge themselves to increase accuracy.

As the artificial intelligence system is used, the accuracy of the results produced by repeated learning improves and the user's intention can be more accurately reflected. Accordingly, the existing rule-based smart system is gradually being replaced with an artificial intelligence system based on deep learning.

Artificial intelligence technology is a technology that uses machine learning, and deep learning is a type of machine learning. Deep learning is an algorithmic technology that classifies and learns features of input data by itself. In addition, elementary technology is a technology that simulates functions of the human brain such as cognition and judgment by using machine learning algorithms such as deep learning, which consists of technologies such as verbal understanding, visual understanding, reasoning/prediction, knowledge expression, and motion control.

Censorship algorithms may include at least one of deep neural network (DNN), convolutional neural network (CNN), recurrent neural network (RNN), region-based convolutional neural networks (R-CNN), limited Boltzmann machine (RBM)), deep belief network (DBN), or deep Q-networks.

In some example embodiments, the censoring algorithm may be a convolutional neural network. Censorship algorithms may include AlexNet, ZFNet, GoogLeNet, VGGNet, ResNet, Inception-ResNet, Inception-v2, Inception-v3, or Inception-v4.

The censoring algorithm may be a neural network including at least two or more layers. The censoring algorithm may include an input layer and an output layer. The censoring algorithm may further include at least one or more hidden layers.

However, it is not limited to the above example embodiments, and the censoring algorithm according to various example embodiments may be a model including a predetermined decision tree, or may correspond to a logic algorithm model other than that.

In some example embodiments, the sound censoring algorithm may be a classification model learned by using classification information on whether there is a specific sound and whether an inappropriate element is included in the specific sound. Alternatively, the video censoring algorithm may be a classification model learned by using classification information on whether there is a specific video and whether an inappropriate element is included in the specific video. For example, the video censoring algorithm may include an algorithm of acquiring image in units of a predetermined frame from a video and censoring the acquired image.

Alternatively, the text censoring algorithm may be a classification model learned by using classification information on whether there is a specific text and whether an inappropriate element is included in the specific text. Alternatively, the gesture censoring algorithm may be a classification model learned by using classification information on whether an inappropriate gesture is included in a specific video.

In some example embodiments, when the report is classified into a video category, the report evaluation device 100 may call at least one of a video censoring algorithm and a gesture censoring algorithm. In addition, when the report is classified into a video category, since there is a high probability of including inappropriate sound content, the report evaluation device 100 may call a sound censoring algorithm.

In some example embodiments, when the report is classified into a text category, the report evaluation device 100 may call a text censoring algorithm.

In some example embodiments, when the report is classified into a sound category, the report evaluation device 100 may call a sound censoring algorithm. In addition, when the report is classified into a sound category, since there is a high probability of including inappropriate video content, the report evaluation device 100 may call a video censoring algorithm.

This is only an example embodiment for explaining the present disclosure, and the report evaluation device 100 may call at least one or more learning e among a video censoring algorithm, a sound censoring algorithm, a text censoring algorithm, and a gesture censoring algorithm corresponding to the category of the report.

In operation S140, the report evaluation device 100 may evaluate the reliability of the report.

A method of evaluating the reliability of the report by the report evaluation device 100 may be described with reference to FIG. 4.

FIG. 4 is a diagram showing an algorithm for evaluating the reliability of a report according to an example embodiment of the present disclosure.

Referring to FIG. 4, a report received by the report evaluation device 100 may include information on inappropriate sound content. The report may include the sound recorded for a predetermined time based on the time of the report and information on the reason for the report.

In some example embodiments, the report may include a sound recorded from 6 seconds (start_sec: 6) to 8 seconds (end_sec: 8) and a reason for the report according to an inappropriate sound (VERBAL_ABUSE).

The report evaluation device 100 may evaluate the reliability of the report using a sound censoring algorithm. The report evaluation device 100 may check if it includes foul languages such as "babo", "eomma", "michin", and "yamma" in the sound recorded using the sound censoring algorithm. The above types of foul languages are only examples for explaining the present disclosure, and the sound censorship algorithm can check whether various foul languages are included.

The report evaluation device 100 may predict that the reliability of the foul languages included in the recorded sound is "eomma" is the highest as 0.3649329300969839.

The report evaluation device 100 may determine the number of times the report needs to be reviewed based on the reliability.

For example, when the reliability is greater than or equal to "0" and less than "0.8", the report evaluation device 100 may determine the number of times the report needs to be reviewed as two. Alternatively, when the reliability is greater than or equal to "0.8" and less than "0.95", the report evaluation apparatus 100 may determine the number of times the report needs to be reviewed as one. Alternatively, if the reliability is higher than "0.95" and less than "1", the number of times the report needs to be reviewed can be determined as zero.

In some example embodiments, since the reliability of the report received by the report evaluation device 100 is "0.3649329300969839", the number of times that the report needs to be reviewed may be determined as two.

Meanwhile, based on the number of times the report needs to be reviewed based on the reliability, when the number of times that the report needs to be reviewed is determined to be more than one, the report evaluation apparatus 100 may transmit at least some of the information included in the report and the reliability evaluation result information of the report to one or more external devices. For example, the external device may include a terminal corresponding to an agent.

For example, when the number of times that a specific report needs to be reviewed is determined as one, the report evaluation apparatus 100 may transmit the report-related information (e.g., at least some of the information included in the report and the reliability evaluation result information of the report) to a first terminal corresponding to a first agent. Accordingly, the report may be reviewed by the first agent, and the report review result may be received from the first terminal corresponding to the first agent.

For example, when the number of times that a specific report needs to be reviewed is determined as two, the report evaluation apparatus 100 may transmit the report-related information to the first terminal corresponding to the first agent and a second terminal corresponding to a second agent, respectively. Accordingly, the report may be reviewed by different agents (the first agent and the second agent), respectively, and the report review results from each of the first terminal corresponding to the first agent and the second terminal corresponding to the second agent can be received. In addition, censoring results may be checked based on the results of the received reviews of the report. In addition, if the review results are different from each other, report-related information can be delivered to a terminal corresponding to an agent selected to perform additional review.

As described above, according to various example embodiments of the present disclosure, a subject evaluating the reliability of a report (e.g., the reliability evaluation part 120 of the report evaluation apparatus 100) and a subject reviewing the report (e.g., the first agent and/or the second agent) may be set differently to obtain a more reliable report review result.

Referring back to FIG. 3, when the report includes information on inappropriate sound content, the result of evaluating the reliability may include the type of foul language, the reliability, and the number of times required to be reviewed. For example, the type of foul language may be "eomma", the reliability may be "0.3649329300969839", and the number of times required to be reviewed may be two.

Figure 5:
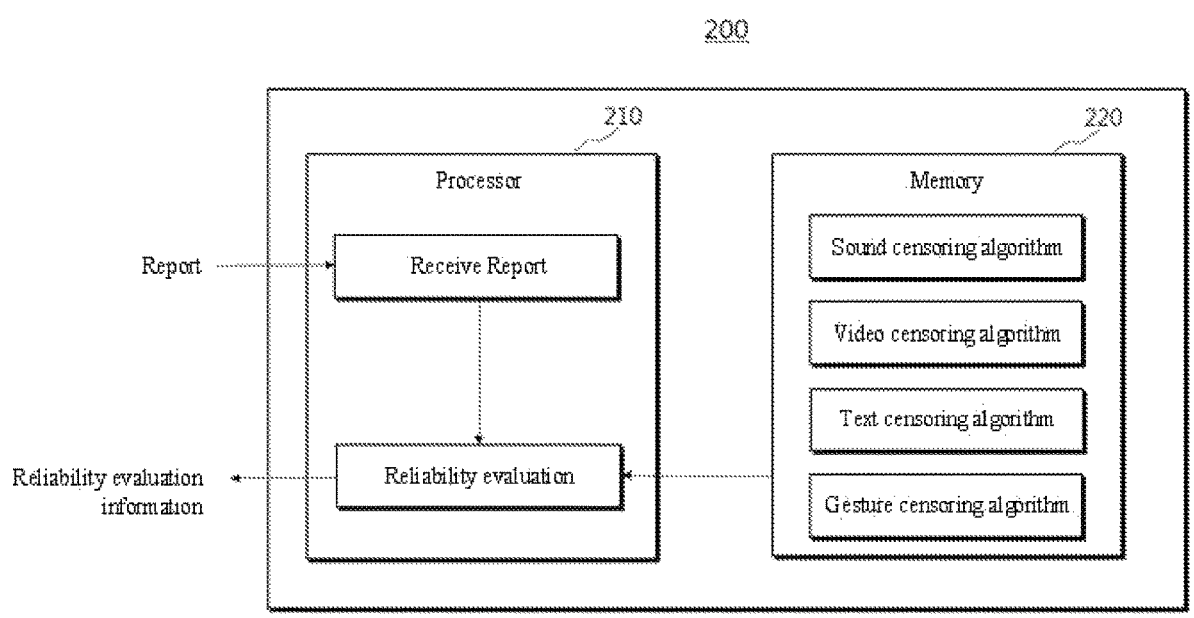
FIG. 5 is a diagram schematically showing the configuration of a report evaluation device according to an example embodiment of the present disclosure.

FIG. 5 is a diagram schematically showing the configuration of a report evaluation device according to an example embodiment of the present disclosure.

The report evaluation device 200 may include a processor 210 and a memory 220. Those skilled in the art to which the present disclosure pertains would appreciate that other general-purpose components may be further included in addition to the components illustrated in FIG. 5.

The report evaluation device 200 may be similar or the same as the report evaluation device 100 shown in FIG. 2. The report receiving part 110 and the reliability evaluation part 120 included in the report evaluation device 100 may be included in the processor 210.

The processor 210 controls the overall operation of the report evaluation device 200 and may include at least one processor such as a CPU. The processor 210 may include at least one dedicated processor corresponding to each function, or may be an integrated type of processor.

The memory 220 may store programs, data, or files that control the report evaluation device 200. The memory 220 may store instructions executable by the processor 210. The processor 210 may execute a program stored in the memory 220, read data or a file stored in the memory 220, or store new data. Also, the memory 220 may store program commands, data files, or data structures alone or in combination thereof.

The memory may include a sound censoring algorithm, a video censoring algorithm, a text censoring algorithm, and a gesture censoring algorithm.

The processor 210 may receive a report generated during a video call session from at least one of the first terminal 10 or the second terminal 20. The report may include information about inappropriate video content, information about inappropriate text content, or information about inappropriate sound content.

The information on inappropriate video content may include a video received at the time of reporting to the terminal that performed the report and information on the reason for the report. Alternatively, the information on inappropriate text content may include text received at the time of reporting to the terminal that performed the report and information on the reason for the report. Alternatively, the information on inappropriate sound content may include a sound received at the time of reporting on the terminal that performed the report and information on the reason for the report.

The processor 210 may classify a category of the report. In some example embodiments, the categories may be classified into video, text, and sound.

For example, if the report includes information on inappropriate video content, the processor 210 may classify it into a video category. Alternatively, if the report includes information on inappropriate text content, the processor 210 may classify it into a text category. Alternatively, if the report includes information on inappropriate sound content, the processor 210 may classify it into a sound category.

The processor 210 may call a learning e corresponding to the classified category. The processor 210 may call at least one of a sound censoring algorithm, a video censoring algorithm, a text censoring algorithm, or a gesture censoring algorithm stored in the memory 220.

In some example embodiments, the processor 210 may call at least one of a video censoring algorithm and a gesture censoring algorithm. In addition, when the report is classified into a video category, since there is a high probability of including inappropriate sound content, the processor 210 may call a sound censoring algorithm. Meanwhile, the video censoring algorithm may include a command for acquiring at least some of the images in each frame unit constituting the video and censoring (analyzing) the images.

In some example embodiments, when the report is classified into a text category, the processor 210 may call a text censoring algorithm.

In some example embodiments, when the report is classified into a sound category, the processor 210 may call a sound censoring algorithm. In addition, when the report is classified into a sound category, since there is a high probability of including inappropriate video content, the processor 210 may call a video censoring algorithm together with the sound censoring algorithm.

This is only an example embodiment for explaining the present disclosure, and the processor 210 may call at least one or more learning model (e.g., machine learning model) among a video censoring algorithm, a sound censoring algorithm, a text censoring algorithm, and a gesture censoring algorithm corresponding to the category of the report.

Meanwhile, the processor 210 may determine the type of a censoring algorithm (e.g., a learning model) to be called based on the type of language included in the report. For example, the processor 210 may call the censorship algorithm corresponding to respective language based on the type of language included in the content (e.g., video content, text content, sound content, etc.) included in the report, or the type of language in which information on the reason for the report is recorded. For example, when the language included in the report is Korean, the processor 210 may evaluate the reliability of the report using a censoring algorithm processing Korean, and when the language included in the report is Turkish, the reliability of the report can be evaluated using a censorship algorithm processing Turkish.

For another example, the processor 210 may determine the type of a censoring algorithm (e.g., a learning model) to be called based on a report path in which a user report is performed. For example, the processor 210 distinguishes the report generated by performing the report through the user's nickname and the report generated by performing the report through the user profile (e.g., biography information), and different censorship algorithms corresponding to respective reports can be called.

As describe above, it is possible to improve the accuracy of the censorship result by calling an appropriate censoring model and performing censorship according to context information such as the type of language and the path in which the report is performed.

The processor 210 may evaluate the reliability of the report. The processor 210 may determine that the report includes information on inappropriate sound content. The report may include the sound recorded for a predetermined time based on the time of the report and information on the reason for the report.

In some example embodiments, the report may include a sound recorded from 6 seconds (start_sec: 6) to 8 seconds (end_sec: 8) and a reason for the report according to an inappropriate sound (VERBAL_ABUSE).

The processor 210 may evaluate the reliability of the report using a sound censoring algorithm. The processor 210 may check if it includes foul languages such as "babo", "eomma", "michin", and "yamma" in the sound recorded using the sound censoring algorithm. The above types of foul languages are only examples for explaining the present disclosure, and the sound censorship algorithm can check whether various foul languages are included.

The processor 210 may predict that the reliability of the foul languages included in the recorded sound is "eomma" is the highest as 0.3649329300969839.

The processor 210 may determine the number of times the report needs to be reviewed based on the reliability. For example, when the reliability is greater than or equal to "0" and less than "0.8", the processor 210 may determine the number of times the report needs to be reviewed as two. Alternatively, when the reliability is greater than or equal to "0.8" and less than "0.95", the processor 210 may determine the number of times the report needs to be reviewed as one. Alternatively, if the reliability is higher than "0.95" and less than "1", the number of times the report needs to be reviewed can be determined as zero.

In some example embodiments, since the reliability of the report received by the report evaluation device 100 is "0.3649329300969839", the number of times that the report needs to be reviewed may be determined as two.

Referring back to FIG. 3, when the report includes information on inappropriate sound content, the result of evaluating the reliability may include the type of foul language, the reliability, and the number of times required to be reviewed. For example, the type of foul language may be "eomma", the reliability may be '0.3649329300969839', and the number of times required to be reviewed may be two.

As described with reference to FIGS. 1 to 5, the report evaluation devices 100 and 200 may prevent a user making a video call with the counterpart from being exposed to inappropriate video or audio from the counterpart.

In addition, the report evaluation devices 100 and 200 may prevent sexual shame or displeasure that a user making a video call with the counterpart may feel by the video from the counterpart.

The example embodiments described above may also be implemented in the form of a recording medium including instructions executable by a computer, such as a program module executed by a computer. Computer-readable media can be any available media that can be accessed by a computer, and can include both volatile and non-volatile media, and both removable and non-removable media.

Further, the computer-readable media may include computer storage media. Computer storage media may include both volatile and nonvolatile, and both removable and non-removable media implemented in any method or technology for storage of information such as computer readable instructions, data structures, program modules or other data.

Although the example embodiments of the present disclosure have been described with reference to the accompanying drawings above, those skilled in the art to which the present disclosure pertains can understand that the present disclosure can be implemented in other specific forms without changing the technical spirit or essential features. Therefore, it should be understood that the example embodiments described above are illustrative and non-limiting in all respects.

What is claimed is:

1. A report evaluation method of an electronic device comprising:
   establishing, using the electronic device, a video call session between a plurality of client terminals;
   receiving, at the electronic device, a report from at least one client terminal among the plurality of client terminals in the video call session, wherein the report is initiated by a user at the at least one client terminal to indicate detection of inappropriate content within the video call session;
   analyzing, using the electronic device, content included within the report to determine at least one data type of the content, wherein the at least one data type is selected from the group consisting of video, audio and text;
   determining, using the electronic device, a category of the received report, wherein the category is based on the at least one data type of the content;
   identifying, using the electronic device, a model corresponding to the category;
   evaluating, using the electronic device, a reliability of the received report through the model, wherein the received report includes an indication by the user of detection of inappropriate content; and
   generating and outputting, from the electronic device, information on the reliability.

2. The report evaluation method of claim 1, wherein the report includes video information, text information, or audio information.

3. The report evaluation method of claim 1, further comprising:
   evaluating the reliability of the received report according to a predetermined criterion independently of the model; and
   updating an associated model in response to the evaluation result.

4. The report evaluation method of claim 1, wherein the report includes information about inappropriate video content, information about inappropriate text content, or information about inappropriate sound content.

5. The report evaluation method of claim 1, wherein the model corresponds to one of a sound censoring algorithm, a video censoring algorithm, a text censoring algorithm, or a gesture censoring algorithm.

6. A non-transitory computer-readable recording medium on which a program for performing the method according to claim 1 is recorded.

7. The report evaluation method of claim 1, wherein determining a category of the received report includes
   determining a category of the report based on any one of a type of content included in the report, a type of language corresponding to the report, or a request path for generating the report.

8. The report evaluation method of claim 1, further comprising transmitting at least some of information included in the report and reliability evaluation result information of the report to an external device based on the information on the reliability.

9. A report evaluation device comprising:
   a report receiving part configured to receive a report from at least one client terminal among a plurality of client terminals that have established a video call session with each other, wherein the report is initiated by a user at the at least one client terminal to indicate detection of inappropriate content within the video call session;
   a model storage part configured to store at least one model; and
   a reliability evaluation part configured to analyze content included within the report to determine at least one data type of the content, wherein the at least one data type is selected from the group consisting of video, audio and text, determine a category of the received report, wherein the category is based on the at least one data type of the content, to identify a model corresponding to the category among the at least one model, and to evaluate a reliability of the received report through the identified model, wherein the received report includes an indication by the user of detection of inappropriate content, wherein
   the reliability evaluation part generates and outputs information on the reliability.

10. The report evaluation device of claim 9, wherein the report includes video information or audio information.

11. The report evaluation device of claim 9, wherein the reliability evaluation part is further configured to:
   evaluate the reliability of the received report according to a predetermined criterion independently of the model; and
   update an associated model in response to the evaluation result to store in the model storage part.

12. The report evaluation device of claim 9, wherein the report includes information about inappropriate video content or information about inappropriate sound content.

13. The report evaluation device of claim 9, wherein the at least one model corresponds to one of a sound censoring algorithm, a video censoring algorithm, a text censoring algorithm, or a gesture censoring algorithm.

\* \* \* \* \*